(12) United States Patent
Calacaterra et al.

(10) Patent No.: US 8,494,931 B2
(45) Date of Patent: Jul. 23, 2013

(54) MANAGEMENT OF ACTIONS BASED ON PRIORITY LEVELS AND CALENDAR ENTRIES

(75) Inventors: Jeffrey Alan Calacaterra, Research Triangle Park, NC (US); Gregory Richard Hintermeister, Rochester, MN (US); David Bruce Lection, Research Triangle Park, NC (US); Alan David Seid, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 12/832,865

(22) Filed: Jul. 8, 2010

(65) Prior Publication Data

US 2012/0011035 A1 Jan. 12, 2012

(51) Int. Cl.
*H04M 15/00* (2006.01)
(52) U.S. Cl.
USPC .......................................................... 705/34
(58) Field of Classification Search
USPC .......................................................... 705/34
See application file for complete search history.

(56) References Cited

U.S. PATENT DOCUMENTS

| | | | | |
|---|---|---|---|---|
| 5,664,175 A | * | 9/1997 | Jackson et al. .......................... 1/1 |
| 5,899,979 A | * | 5/1999 | Miller et al. .................. 705/7.21 |
| 6,477,585 B1 | | 11/2002 | Cohen et al. |
| 6,617,969 B2 | | 9/2003 | Tu et al. |
| 6,697,810 B2 | | 2/2004 | Kumar et al. |
| 7,548,955 B2 | | 6/2009 | Nicholas, III |
| 2002/0178161 A1 | * | 11/2002 | Brezin et al. ..................... 707/10 |
| 2003/0097273 A1 | * | 5/2003 | Carpenter et al. ................ 705/1 |
| 2003/0225732 A1 | * | 12/2003 | Chan et al. ......................... 707/1 |
| 2005/0060365 A1 | * | 3/2005 | Robinson et al. ............. 709/203 |
| 2005/0108074 A1 | * | 5/2005 | Bloechl et al. .................... 705/8 |
| 2005/0165631 A1 | * | 7/2005 | Horvitz ............................. 705/7 |
| 2005/0222891 A1 | * | 10/2005 | Chan et al. ........................ 705/9 |
| 2008/0133748 A1 | | 6/2008 | Nicholas |
| 2009/0070442 A1 | | 3/2009 | Kacin et al. |
| 2009/0172103 A1 | | 7/2009 | Tuli |

OTHER PUBLICATIONS

Bunch et al., "Software Agents for Process Monitoring and Notification", Mar. 2004, pp. 94-99.
Fiege et al., "Engineering Event-Based Systems With Scopes", 2002, pp. 309-333.

* cited by examiner

*Primary Examiner* — Seye Iwarere
(74) *Attorney, Agent, or Firm* — Rabindranath Dutta; Konrad, Raynes, Davda & Victor LLP

(57) ABSTRACT

A management application implemented in a computational device maintains priorities corresponding to a plurality of resources coupled to the computational device. Indications for actions to be performed corresponding to occurrences of events are stored to a calendar, wherein the calendar is configurable by a user. A selected indication for an action to be performed is stored to the calendar. In response to an occurrence of an event associated with a selected resource, a priority of the selected resource is determined. The action is performed, based on at least the determined priority of the selected resource and the selected indication for the action stored in the calendar, wherein different actions are performed in response to occurrences of a selected event at different times.

18 Claims, 10 Drawing Sheets

MANAGEMENT OF ACTIONS BASED ON PRIORITY LEVELS AND CALENDAR ENTRIES

BACKGROUND

1. Field

The disclosure relates to a method, a system, and a computer program product for the management of actions based on priority levels and calendar entries.

2. Background

A computing environment may include a plurality of resources, wherein the resources may comprise physical servers, virtual servers, clients, storage devices, operating systems, other software systems, etc. A computational device that manages the plurality of resources may be coupled to the plurality of resources via one or more networks.

Systems management software that executes within the computational device may be used to manage the plurality of resources included in the computing environment. The systems management software may generate notifications in response to failures associated with one or more of the plurality of resources. In certain situations, the systems management software may forward such notifications to an administrator of the computing environment. On receiving such notifications, the administrator may take appropriate actions to resolve the failures associated with the one or more of the plurality of resources.

SUMMARY OF THE PREFERRED EMBODIMENTS

Provided are a method, a system, and a computer program product in which a management application implemented in a computational device maintains priorities corresponding to a plurality of resources coupled to the computational device. Indications for actions to be performed corresponding to occurrences of events are stored to a calendar, wherein the calendar is configurable by a user. A selected indication for an action to be performed is stored to the calendar. In response to an occurrence of an event associated with a selected resource, a priority of the selected resource is determined. The action is performed, based on at least the determined priority of the selected resource and the selected indication for the action stored in the calendar, wherein different actions are performed in response to occurrences of a selected event at different times.

In additional embodiments, the indication for the action indicates which action is to be performed or how the action is to be performed. In certain embodiments, the action is a notification action, wherein at least an electronic communication address of the user is indicated in the calendar to notify the user during a selected time period. An alternate user to send the notification action to, if the user is unavailable during the selected time period is also indicated. Furthermore, in response to an occurrence of an event during the selected time period and unavailability of the user during the selected time period, the notification action is sent to the alternate user.

In further embodiments, the selected resource is a first resource, wherein the first resource is of a higher priority than a second resource, and wherein the event is a failure event. In response to the failure event associated with the first resource, the first resource is continued to be maintained and a telephonic message is sent to an administrator indicating the failure event associated with the first resource. In response to another failure event associated with the second resource, operation of the second resource is suspended and an electronic mail to report the suspending of the operation of the second resource is sent.

In certain embodiments, customer contract information details are maintained in the calendar. In response to exceeding contracted customer services for a customer, a notification is sent to the customer for additional payments in response to an occurrence of an event associated with a resource owned or leased by the customer.

In further embodiments, the plurality of resources include a server, a client, a storage device, an operating system, and a network. The priorities are maintained in a resource priority data structure maintained in the computational device and a selected plurality of resources are grouped into a resource group, wherein all resources of the resource group have the same priority. Additionally, actions are determined based on a plurality of predetermined policies stored in the computational device, wherein different actions are performed in response to an event associated with a selected resource based on a relationship of the selected resource to other resources.

BRIEF DESCRIPTION OF THE DRAWINGS

Referring now to the drawings in which like reference numbers represent corresponding parts throughout.

DETAILED DESCRIPTION

Figure 1:
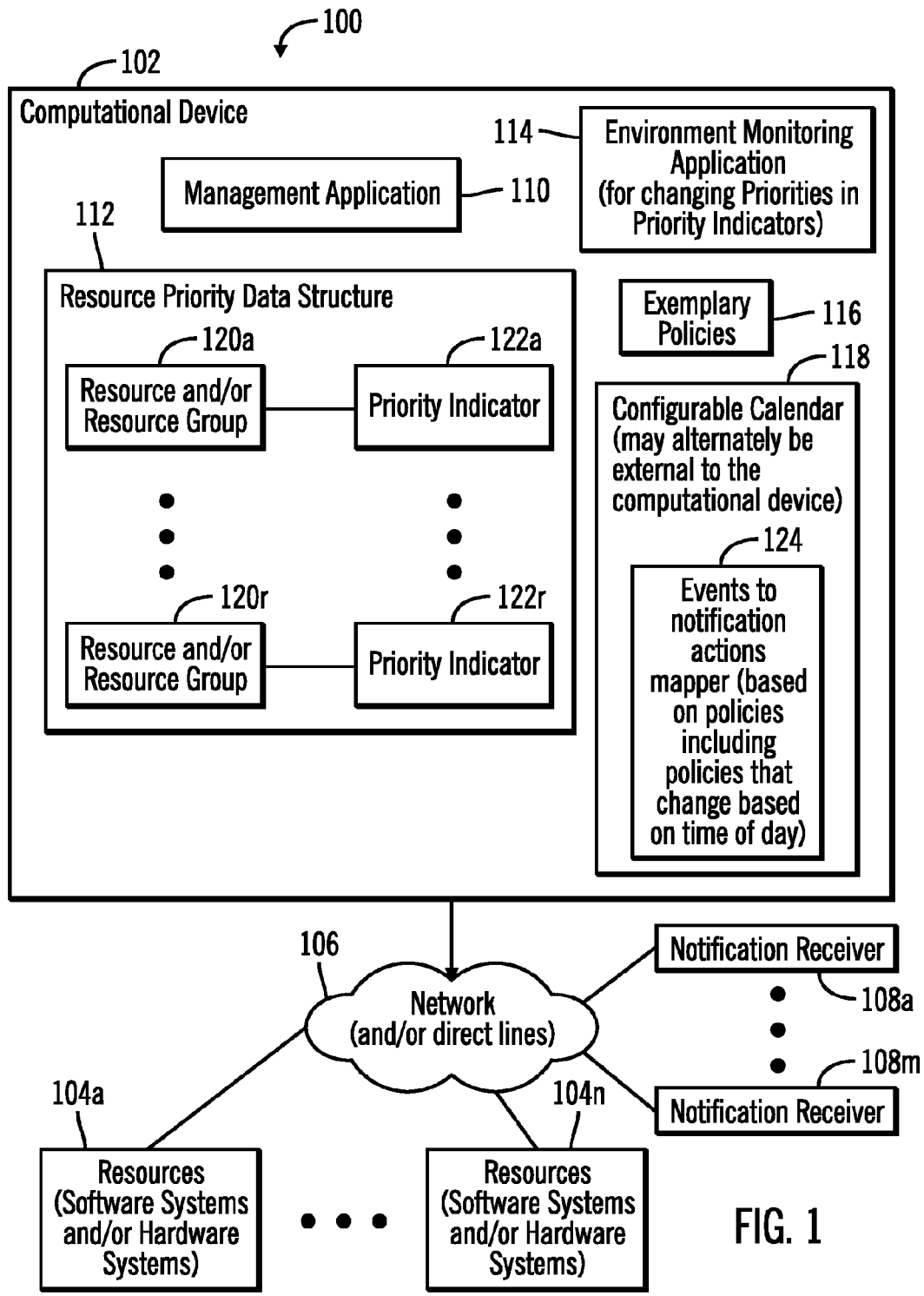
FIG. 1 illustrates a block diagram of a computing environment that includes a computational device coupled to a plurality of resources, in accordance with certain embodiments.

In the following description, reference is made to the accompanying drawings which form a part hereof and which illustrate several embodiments. It is understood that other embodiments may be utilized and structural and operational changes may be made.

A systems management software determines the importance of resources, such as servers, storage devices, software systems, etc., that are maintained in a computing environment. If a failure in the computing environment is caused by any resource, then based on the importance of the resource and other predetermined policies, the systems management software determines what action to perform. In certain situations, the action to perform may include determining whether or not to send a notification, when to send the notification, and whom to send the notification. A calendar is provided to designate a person who is responsible for maintaining a resource and to determine an appropriate task to run depending on the time of the day.

Actions Based on Importance of Resources

Certain resources may be categorized as mission-critical resources and a failure of such mission-critical resources may cost customers significantly more money in terms of lost revenues in comparison to other resources that are not mission-critical resources. In certain situations, the resources that are not mission-critical may be used for testing or may otherwise be less important in comparison to mission-critical resources. Different actions may have to be performed based on the importance of resources. Exemplary actions that may have to be performed may include rebooting a resource such as a computational device, installing a patch on computational device to repair a software problem, and/or sending a notification action to appropriate system administrators.

In certain situations, system administrators may desire that they be notified at any time of the day about problems on high-priority resources, wherein the mission-critical resources may be designated as high-priority resources. However, system administrators may not want to be notified during non working hours about problems with non high-priority resources, such as test systems and applications. Additionally, system administrators may want the problems fixed on high-priority resources as soon as possible, but may not want to pay for the additional cost to have non high-priority resources fixed expeditiously.

Continuous operation of servers may be critical for many businesses and system administrators may need to be notified immediately when there is a problem that needs to be addressed. It is possible that a single administrator may not want to be notified at all times. However this means multiple administrators have to get notifications or multiple administrators have to check the same account. Another approach is to have a pager or a cellular phone that is passed around to the administrator on call. System administrators often have to carry around multiple pagers or cellular phones (since they may have a shared pager/cellular phone when they are on call in addition to their own personal pager/cellular phone). Additionally, the administrator on call may not be available at the time the pager/cellular phone provides a notification. Furthermore, the person who is to be notified may differ depending on the time of day. Certain embodiments provide a calendar to determine which administrator to notify based on the time of the day.

Exemplary Embodiments

FIG. 1 illustrates a block diagram of a computing environment 100 that includes a computational device 102 coupled to a plurality of resources 104a . . . 104n, in accordance with certain embodiments. The computational device 102 may be any suitable device including those presently known in the art, such as, a personal computer, a workstation, a server, a mainframe, a hand held computer, a palm top computer, a telephony device, a network appliance, a blade computer, a storage server, etc. The resources 104a . . . 104n may comprise a server, a client, a storage device, an operating system, other software systems, etc.

The coupling of the computational device 102 to the plurality of resources 104a . . . 104n may be over a network 106, wherein the network 106 may be any network known in the art, such as the Internet, an intranet, a Local area network (LAN), a Storage area network (SAN), a Wide area network (WAN), a wireless network, etc. The computational device 102 may alternatively be connected to the resources 104a . . . 104n without a network, such as through direct lines, common bus systems, etc., in a manner known in the art. Also the network 106 may be part of one or more larger networks or may be an independent network or may be comprised of multiple interconnected networks. In certain embodiments, the computational device 102 and the resources 104a . . . 104n of FIG. 1 may be a cloud component part included in a cloud computing environment.

A plurality of notification receivers 108a . . . 108m may receive notifications from the computational device 102 over the network 106, wherein the notifications may include the status of resources 104a . . . 104n that are coupled to the computational device 102. The notification receivers 108a . . . 108m may comprise computational devices and communication devices, such as telephones, pagers, etc. Users and administrators may use the notification receivers 108a . . . 108m to receive the notifications from the computational device 102.

The computational device 102 includes a management application 110, a resource priority data structure 112, an environment monitoring application 114, exemplary policies 116, and a configurable calendar 118. The management application 110 maintains for a plurality of resources 120a . . . 120r, a plurality of priority indicators 122a . . . 122r, wherein a priority indicator provides the priority of a resource. The management application 110 is more likely to send urgent notifications to the notification receivers 108a . . . 108m in response to a failure of a resource that has a higher priority in comparison to another resource that has a lower priority. In certain alternative embodiments, the resources 120a . . . 120r may comprise resource groups, wherein a resource group has a plurality of resources. The environment monitoring application 114 may monitor the priorities assigned to the resources 120a . . . 120r and may change the priorities based on events that occur in the computing environment 100.

The exemplary policies 116 stored in the computational device 102 may be predetermined and may be used in addition to the priority indicators 122a, by the management application 100 to determine an action to perform in response to events associated with resources that occur in the computing environment 100. The configurable calendar 118 may maintain mappings 124 between events and notification actions based on the exemplary policies 116 including policies that change based on the time of the day. For example, notification actions may be sent at night via telephone to an administrator in response to failure events of resources having a high priority, whereas no notification actions may be sent at night in response to failure events of resources having a low priority.

While FIG. 1 shows the configurable calendar 118 to be located within the computational device 102, in alternative embodiments the configurable calendar 118 may be located external to the computational device 102. For example, the configurable calendar 118 may be a shared calendar that is located on a server that is different from the computational device 102, wherein a plurality of computational devices may access the shared calendar via the server.

Figure 2:
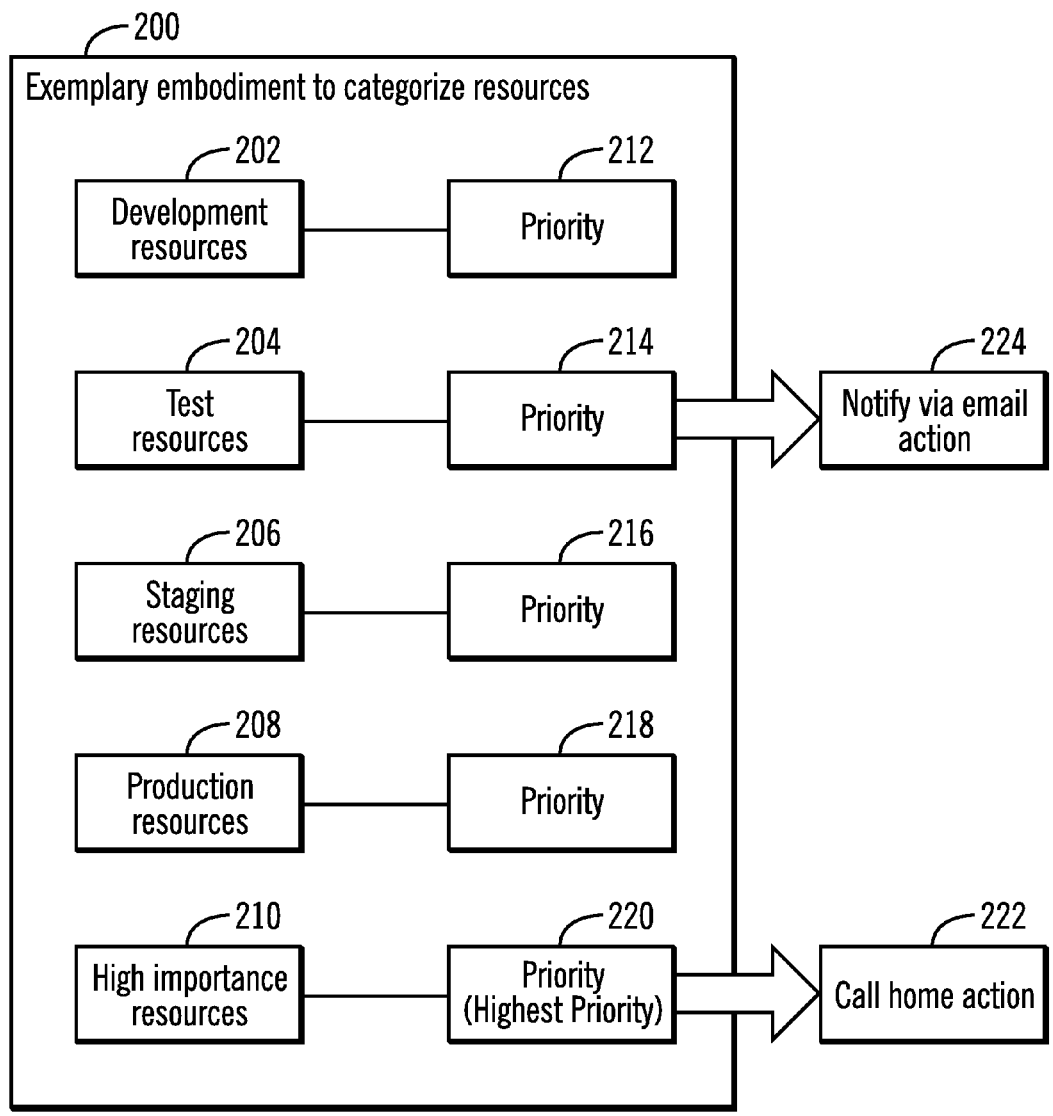
FIG. 2 illustrates a block diagram that shows how exemplary resources are categorized, in accordance with certain embodiments.

FIG. 2 illustrates a block diagram 200 that shows how exemplary resources are categorized, in accordance with certain embodiments. For example, in certain exemplary embodiments the resources 104a . . . 104n (shown in FIG. 1) may be categorized into five exemplary groups: development resources 202, test resources 204, staging resources 206, production resources 208, and high importance resources 210. In certain embodiments, the categorized resource groups 202, 204, 206, 208, 210 shown in FIG. 2 may correspond to the resource groups 120a ... 120r shown in FIG. 1.

The management application 110 may maintain priorities 212, 214, 216, 218, 220 corresponding to the categorized resources 202, 204, 206, 208, 210. In certain embodiments, in response to a failure of any resources within the category of high importance resources 210, wherein the high importance resources have the highest priority 220, a "call home action" 222 is performed, wherein the call home action 222 sends a telephonic message to a user or administrator to indicate the failure of a resource within the category of high importance resources 210. However, in case of a failure of a test resource 204 a non-urgent notification may be sent via electronic mail via a "notify via email action" 224.

Figure 3:
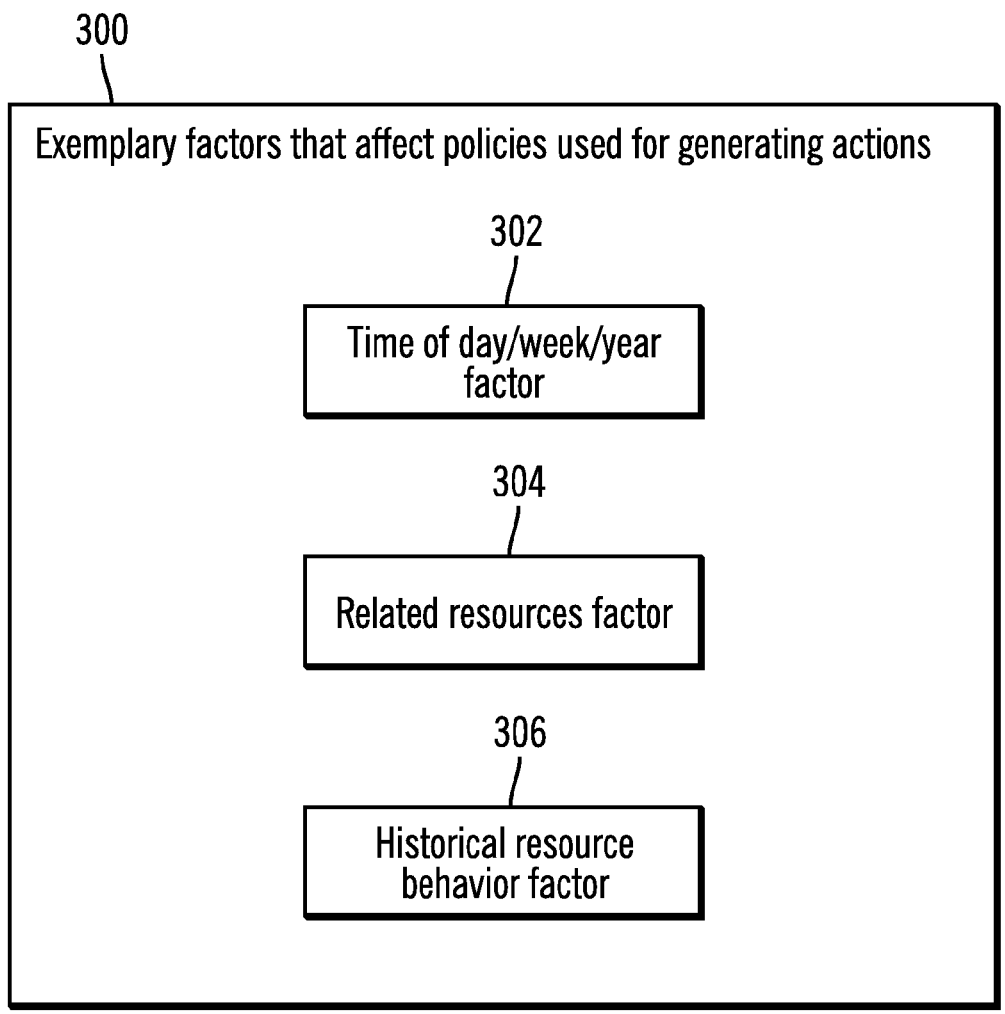
FIG. 3 illustrates a block diagram that shows exemplary factors that affect policies used for generating actions, in accordance with certain embodiments.

FIG. 3 illustrates a block diagram 300 that shows exemplary factors 302, 304, 306 that affect policies used for generating actions, in accordance with certain embodiments. These exemplary factors 302, 304, 306 are in addition to the priorities shown in FIGS. 1 and 2.

In an exemplary embodiment, the time of day/week/year factor 302 may store information such that during office hours, instant messages may be sent to the administrator, whereas when the office is closed emails may be sent to the administrator.

In another exemplary embodiment, the related resources factor 304 may store information such that an exemplary hardware is usually "low" priority, but if a "high" priority workload is relocated to the exemplary hardware, then the exemplary hardware inherits the workload's "high" priority.

In yet another exemplary embodiment, the historical resource behavior factor 306 may store information, such that if a resource is of "low" priority but has a frequent history of problems, then the priority of the resource is increased so that attention is readily obtained for fixing the resource.

Figure 4:
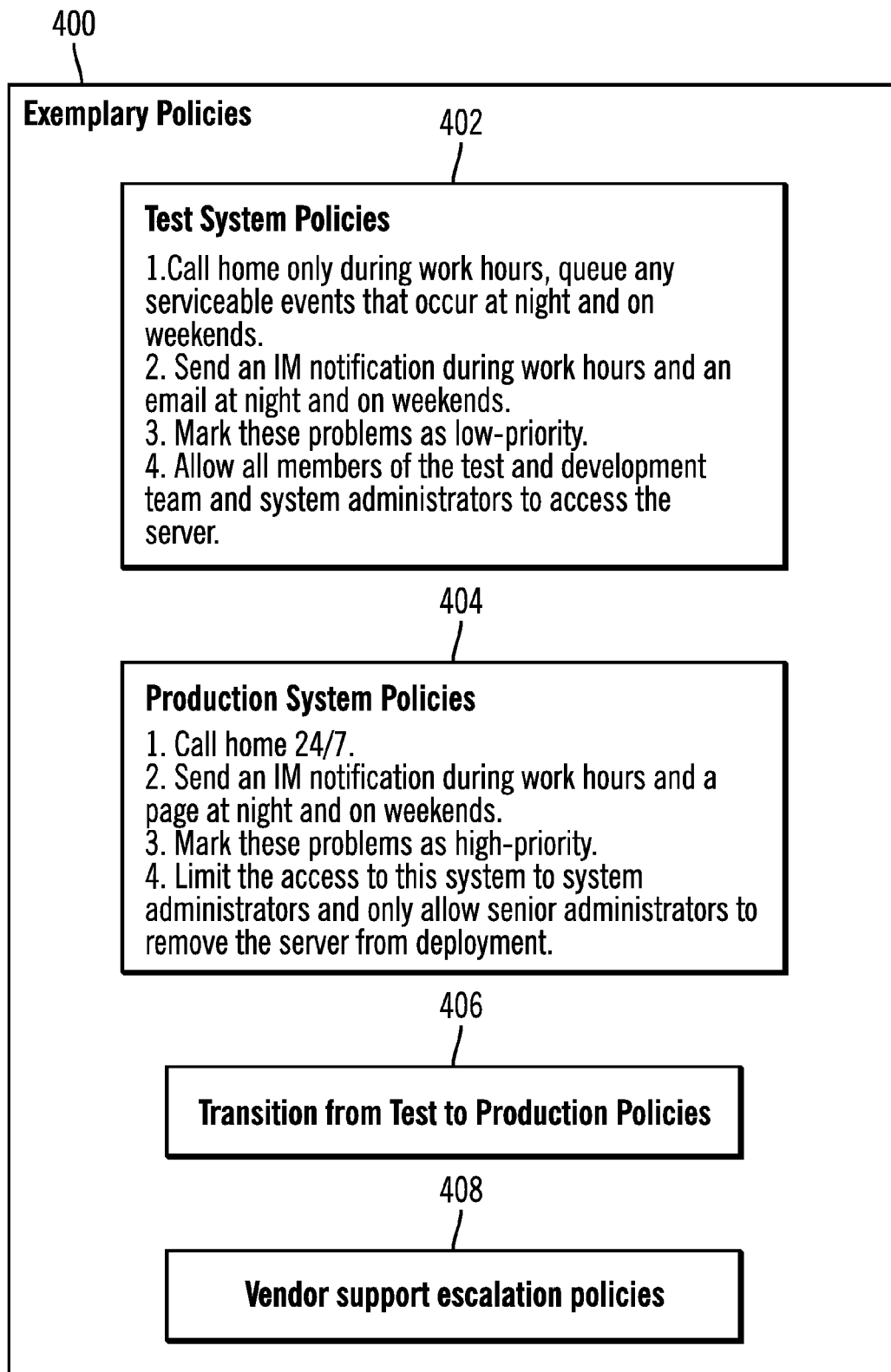
FIG. 4 illustrates block diagram that shows exemplary policies, in accordance with certain embodiments.

FIG. 4 illustrates block diagram that shows exemplary policies 400, in accordance with certain embodiments. Exemplary policies shown in FIG. 4 include test system policies 402, production system policies 404, transition from test to production policies 406 and vendor support escalation policies 408. The exemplary policies 400 shown in FIG. 4 may correspond to the exemplary policies 116 shown in FIG. 1.

Exemplary test system policies 402 may be used to call an administrator home only during work hours, and queue any serviceable events that occur at night and on weekends. In alternative embodiments, an instant message (IM) notification may be sent during work hours and an email at night and on weekends. In certain embodiments, certain selected problems may be marked as low-priority. Additionally, in certain embodiments a selected resource such as a server may be allowed to be accessed by all members of the test and development team.

Exemplary production system policies 404 may be used to call an administrator home at any time (i.e., both during work hours and during non work hours and designated as 24/7 in FIG. 4). In alternative embodiments, an instant message notification may be sent during work hours and a paging notification may be sent at night and on weekends. In additional embodiments, certain selected problems may be marked as high-priority. For production server, policies may limit access to the production server to system administrators and only senior administrators may be authorized to remove the production server from deployment.

Exemplary transition from test to production policies 406 may be used to simplify notification and serviceability policies when transitioning between lifecycle stages of a resource. For example, a virtual server and its hardware may be instantly altered from a test system to a production system by changing a property of the system.

Exemplary vendor support escalation policies 408 may be used to enable new business aspects for deployment within the computing environment 100. For example, a contract may specify that a customer gets ten urgent repair work performed per year, with subsequent repair work incurring a charge. A notification may be provided that lets the administrator approve the additional amounts of money to be changed to the customer after the ten urgent repair works have been performed and additional repair works are needed.

Figure 5:
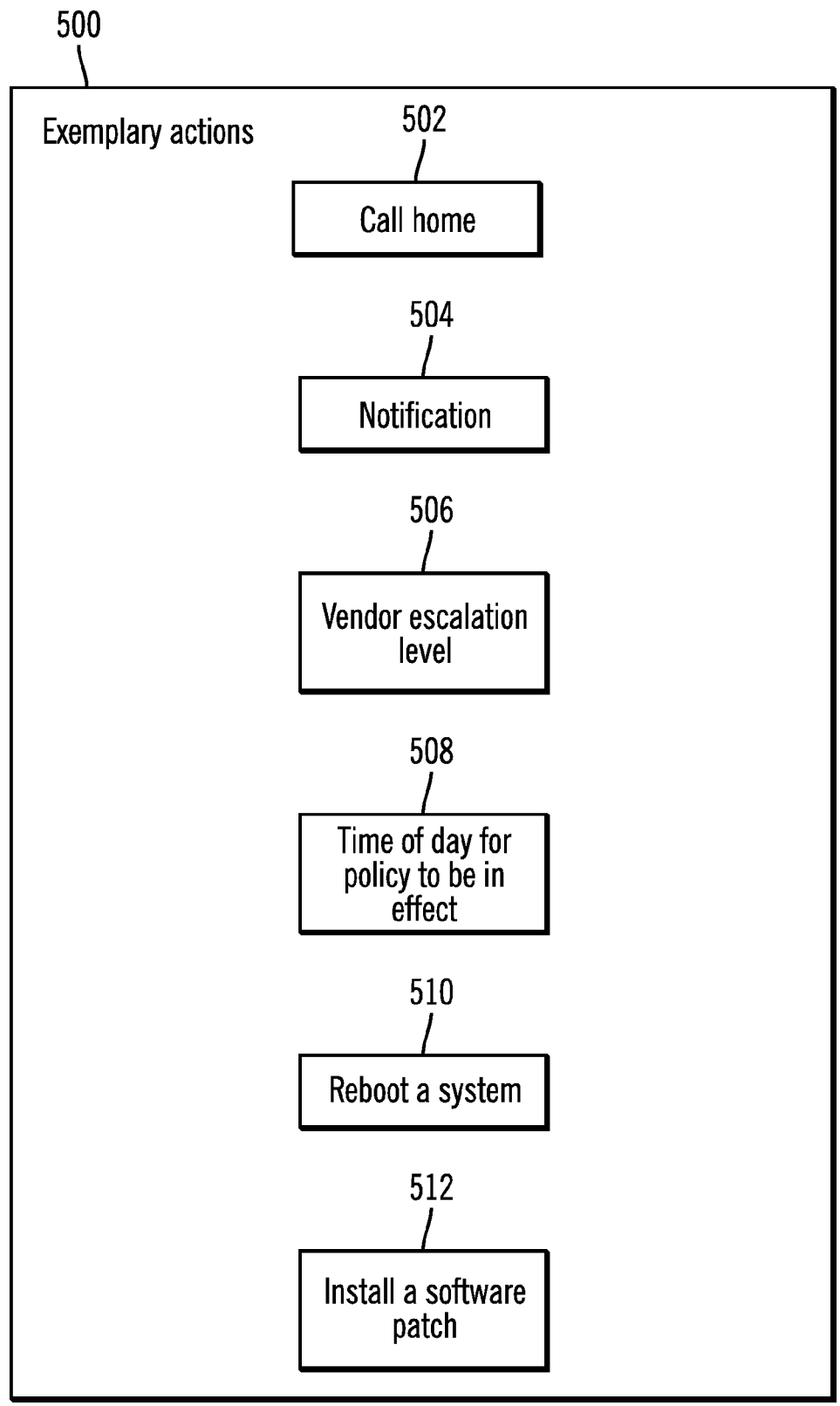
FIG. 5 illustrates block diagram that shows exemplary actions, in accordance with certain embodiments.

FIG. 5 illustrates block diagram that shows exemplary actions 500, in accordance with certain embodiments. The exemplary actions 500 may include a call home action 502 that may be configured to call home, a notification action 504 that may be configured to notify by email, page, etc. or route to an internal service desk, a vendor escalation level 506 that may be configured to a high priority, a normal priority or a low priority, and a time of day for policy to be in effect action 508 that indicates the hours during which a selected action may be performed. Other exemplary actions may include rebooting a system action 510, installing a software patch action 512, etc. The exemplary actions 500 shown in FIG. 5 may be performed as a result of events associated with resources 104a . . . 108n shown in FIG. 1.

Figure 6:
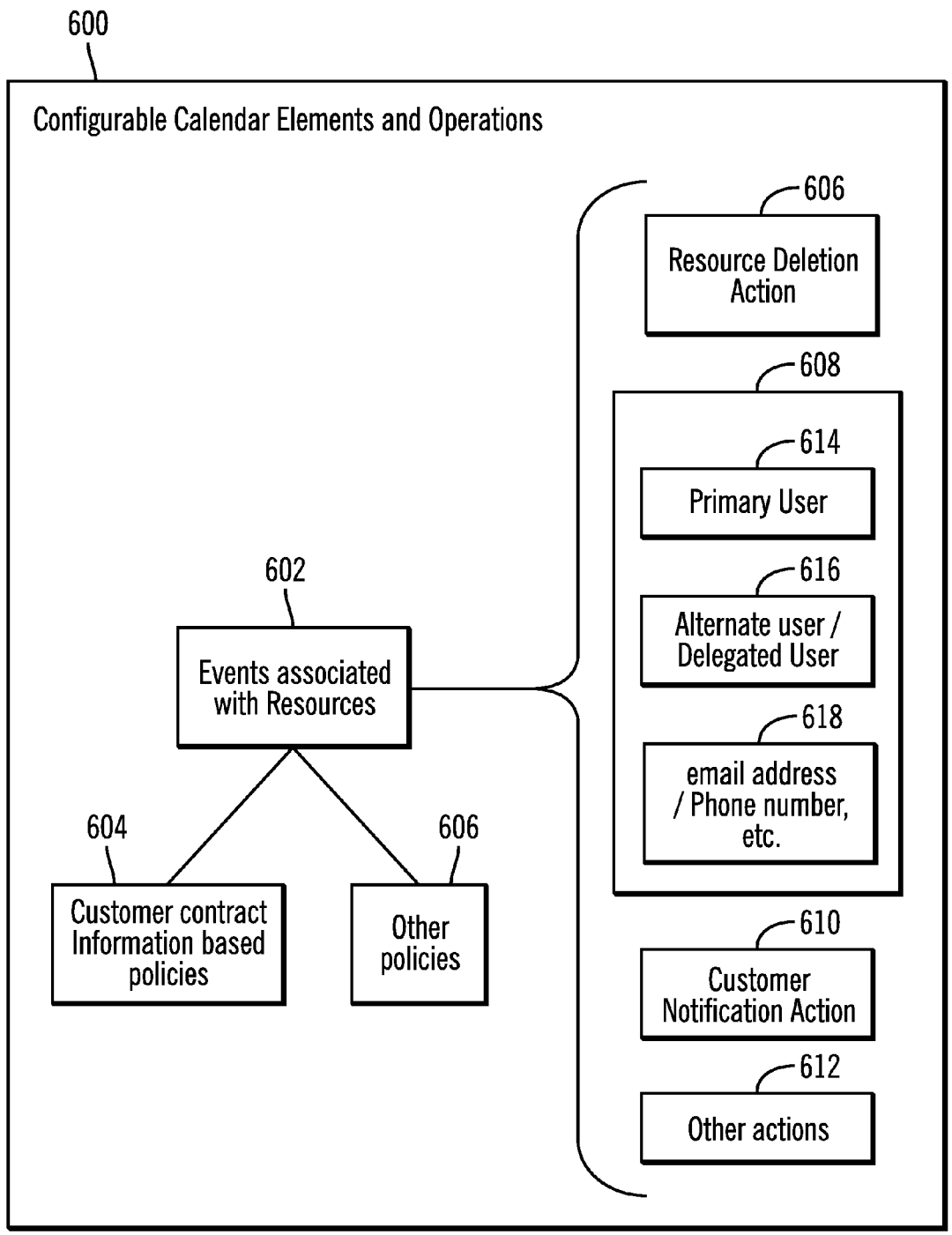
FIG. 6 illustrates block diagram that shows a configurable calendar, in accordance with certain embodiments.

FIG. 6 illustrates block diagram that shows a configurable calendar 600, in accordance with certain embodiments. In certain embodiments, the configurable calendar 600 may correspond to the calendar 118 shown in FIG. 1.

The configurable calendar 600 associates events with resources (shown via reference numeral 602) based on customer contract information based policies 604 and other policies 606, wherein certain exemplary policies were shown in FIG. 4. The actions performed as a result of events associated with resources may include resource deletion actions 606, user notification actions 608, customer notification actions 610, and other actions 612. In the resource deletion action 606, a resource that has failed may be removed or disabled within the computing environment 100. In the user notification action 609 a notification may be sent to a primary user 614 and/or and alternate/delegated user 616. The configurable calendar 600 may also store email addresses/phone numbers, etc., 618 corresponding to the users 614, 616 to whom notifications are to be sent.

In certain embodiments, the configurable calendar 600 may run appropriate tasks based on the time of the day. The configurable calendar 600 may receive emails or other notifications which trigger a task-mapping analysis and runs the appropriate task.

In additional embodiments, a user may determine the overall goal for the calendar 600. The user may update calendar entries to indicate how notifications and other tasks should be achieved based on the time of day. The calendar 600 is also machine-readable such that software programs can either analyze and perform the proper tasks, or notify the calendar 600 and have the calendar 600 perform the tasks.

In certain embodiments, customers/users/administrators may have a shift schedule in some format that specifies who is responsible for maintaining each of the resources. Certain embodiments map the shift schedule to the calendar 600, wherein the calendar 600 includes the desired behaviors at various hours of the day. This calendar 600 is then queried when an event occurs and a notification is generated. When a notification occurs, instead of having a fixed person mapped to a resource, the calendar may be used to look up the person on call and then a notification may be sent to the person who is on call. It may also be possible to have multiple people on call who are notified in different formats.

In one embodiment, the following operations may be built into the management application 110 to implement the calendar 600. In such embodiments, in response to a severe serviceable event occurring on a resource, the management application 110 catches the event and then looks up who is on call for that server in the calendar 600. The calendar 600 program offers scheduling details such as who to contact during a particular time, and how to contact (e.g., email forwarding during day, text from 8 pm-11 pm, etc.). Severity mapping to automate escalation procedures may be implemented and such severity mapping may be mapped to time of day (e.g., Person A is responsible for critical errors all day, Person B is responsible for system warnings 8 am-5 pm, etc.). The calendar 600 sends a notification to the appropriate user or users in the preferred format.

In another embodiment, the calendar 600 is used with a management application 110 that does not natively support the calendar 600. However the management application 110 is able to send email. In this case, the administrator may enter the email for the calendar 600 into the management application 110 and then specify the body of the notification. Once the calendar 600 receives the trigger email, the calendar 600 parses the information in the email to notify the people specified by the calendar 600.

In another embodiment, an end-user notification preference mapping is performed to set the calendar 600 to infer the proper notification format. For example, a selected user can dynamically set the notification preference based on a personal calendar. Using the calendar a user may schedule "attending movie from 8-11 pm Friday. Text notify." and at the same time send an invitation email to the calendar 600. When the calendar 600 processes the configured preference, the calendar 600 sends a text instead of full email or phone call while the user is at the movie.

Figure 7:
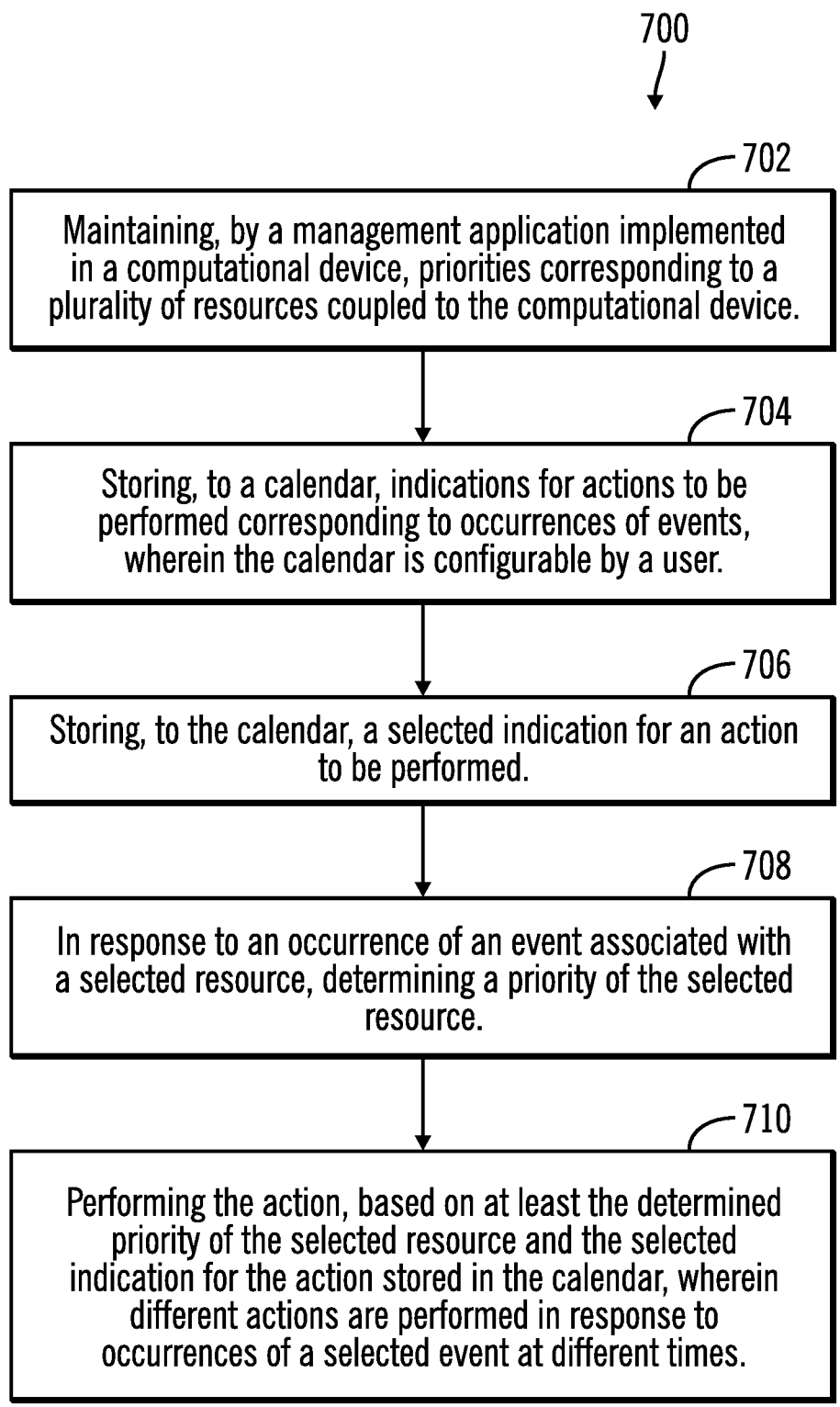
FIG. 7 illustrates a flowchart that shows first operations, in accordance with certain embodiments.

FIG. 7 illustrates a flowchart that shows first operations 700, in accordance with certain embodiments. The operations shown in FIG. 7 may be implemented within the computational platform 102.

Control starts at block 702 in which a management application 110 implemented in a computational device 102 maintains priorities corresponding to a plurality of resources 104a . . . 104n coupled to the computational device 102. Indications for actions to be performed corresponding to occurrences of events are stored (at block 704) to a calendar 118, wherein the calendar 118 is configurable by a user.

Control proceeds to block 706, wherein a selected indication for an action to be performed is stored to the calendar 118. In response to an occurrence of an event associated with a selected resource, a priority of the selected resource is determined (at block 708). The action is performed (at block 710), based on at least the determined priority of the selected resource and the selected indication for the action stored in the calendar, wherein different actions are performed in response to occurrences of a selected event at different times. For example, in an exemplary embodiment, if event "X" occurs between 10 AM to 3 PM an additional processor may be added, whereas if event "X" occurs between 3 PM to 8 PM a server may be suspended.

Therefore, FIG. 7 illustrates certain embodiments in which priorities of resources are used to perform different actions at different times of the day based on indications stored in a calendar. The actions illustrated in FIG. 7 may be notifications or some other types of actions, such as rebooting a server, installing a software patch, etc. Also, in certain embodiments, different actions are performed in response to a selected event associated with a selected resource based on a relationship of the selected resource to other resources. For example, in certain embodiments, if a selected resource such as a network device has a hardware issue, then if the network device is connected to test systems, an administrator is emailed so that the administrator can repair the network device, whereas if the network device is connected to production systems, the hardware issues are emailed to a supporting vendor to replace the network device with a replacement device as soon as possible.

Figure 8:
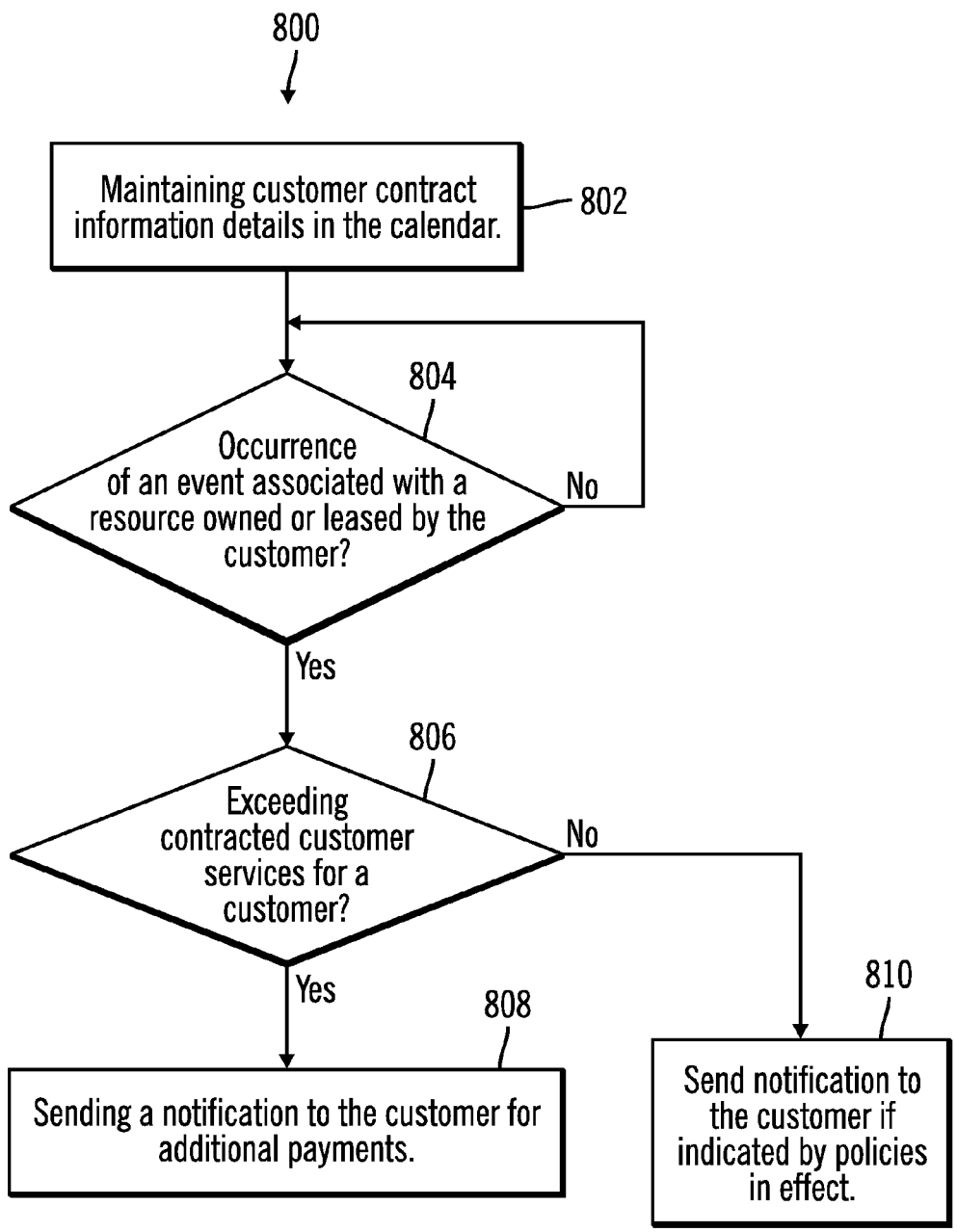
FIG. 8 illustrates a flowchart that shows second operations, in accordance with certain embodiments.

FIG. 8 illustrates a flowchart that shows second operations 800, in accordance with certain embodiments. The operations shown in FIG. 8 may be implemented within the computational platform 102.

Control starts at block 802 in which customer contract information details/policies 604 are maintained in the calendar. A determination is made (at block 804) as to whether an event (such as a failure event) associated with a resource owned or leased by the customer has occurred. If so, control proceeds to block 806 in which a determination is made as to whether contracted customer services for the customer have been exceeded. For example, the customer may only be entitled to five free system repairs and a sixth failure event may cause the contracted customer services to be exceeded. If at block 804 no event associated with a resource owned or leased by the customer occurs, then control is maintained ("No" branch from block 804) at block 804 until such an event occurs.

In response to exceeding contracted customer services for a customer ("Yes" branch from block 806), a notification is sent (at block 808) to the customer for additional payments. If contracted customer services have not been exceeded ("No" branch from block 806) control proceeds to block 810 in which a notification is sent to the customer if such notifications are indicated by policies in effect.

Therefore, FIG. 8 illustrates certain embodiments in which a management application 110 may determine how to notify and charge a customer based on predetermined contracted customer service agreements made with the customer in the event of a failure of resources owned, leased or operated by the customer.

Figure 9:
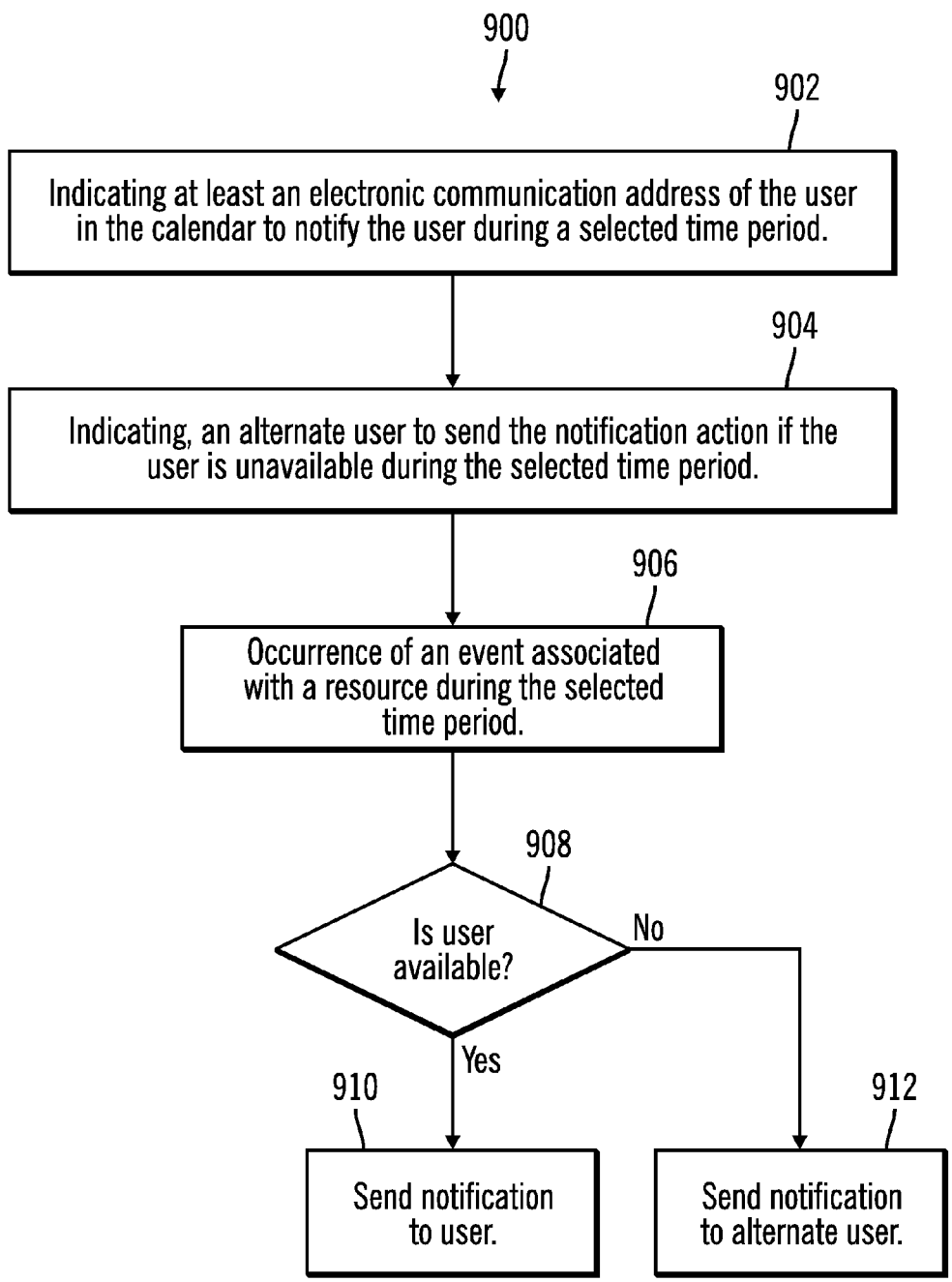
FIG. 9 illustrates a flowchart that shows third operations, in accordance with certain embodiments.

FIG. 9 illustrates a flowchart that shows third operations 900, in accordance with certain embodiments. The operations shown in FIG. 9 may be implemented within the computational platform 102.

Control starts at block 902 in which an indication is made of at least an electronic communication address of a user in the calendar 118, 600, to notify the user during a selected time period. An alternate user is also indicated (at block 904) to send the notification action if the user is unavailable during the selected time period.

In response to the occurrence of an event 906 associated with a resource during the selected time period, a determination is made (at block 908) as to whether the user is available during the selected time period. If so, then notification is sent (at block 910) to the user. If not, then notification is sent (at block 912) to the alternate user.

Therefore, FIG. 9 illustrates certain embodiments in which users may configure the calendar 118, 600 such that different users may receive notifications at different time periods. The provision of an alternate user in case of unavailability of a primary user is also incorporated into the calendar 118, 600.

FIGS. 1-9 illustrate certain embodiments in which a configurable calendar is used to augment a management application 110 that controls resources coupled to a computational device. In case of an event, such as a failure event, associated with a resource, the configurable calendar and the priorities associated with the resource are used in conjunction with predetermined policies to determine how, when, and to whom to send notifications. It should be noted that other actions instead of notifications may be performed directly on systems. For example, when a "High Temperature" event occurs, the "High Temperature" event may be viewed as a "Warning" in a test room but may be changed to "Critical" in a production laboratory, and as a result a corresponding action may be change from "Email" to "Relocate workloads to other hardware in other rooms".

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
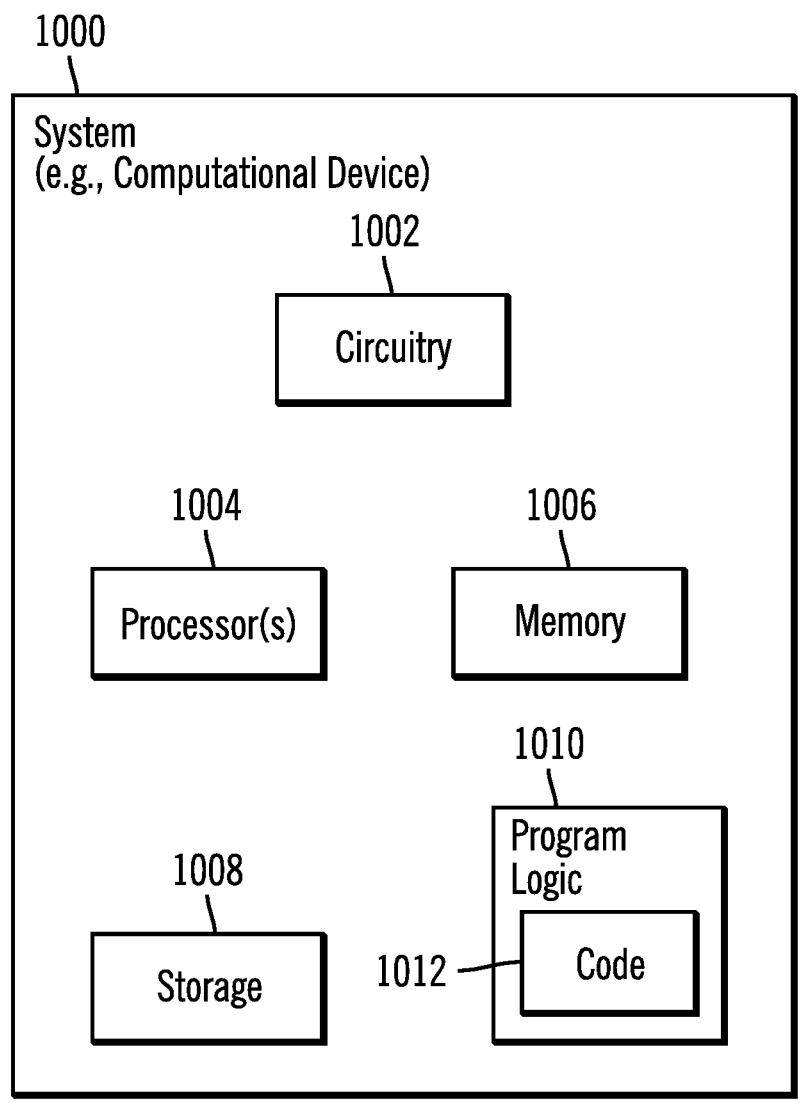
FIG. 10 illustrates a block diagram of a computational system that shows certain elements that may be included in the computational device of FIG. 1, in accordance with certain embodiments.

FIG. 10 illustrates a block diagram that shows certain elements that may be included in the system 1000 in accordance with certain embodiments. The system 1000 may comprise the computational device 102 and may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

In certain embodiments, the computational device 102 and the resources 104a ... 104n of FIG. 1 may be cloud component parts included in a cloud computing environment. In the cloud computing environment the systems architecture of the hardware and software components involved in the delivery of cloud computing may involve a plurality of cloud components communicating with each other. For example, in certain embodiments, the computational device 102 of FIG. 1 may provide clients, and other servers and software and/or hardware components in the networked cloud with storage and data processing services. The computational device 102 may provide reliable storage services and access to the resources 104a ... 104n to meet quality of service requirements for customers in the cloud. The computational device 102 may communicate with clients to provide storage and other services for the resources 104a ... 104n through a web interface or other application programming interface.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining, by a management application implemented in a computational device, priorities corresponding to a plurality of resources coupled to the computational device;
   storing, to a calendar implemented in the computational device, indications for actions to be performed corresponding to occurrences of events, wherein the calendar is configurable by a user;
   storing, to the calendar, a selected indication for an action to be performed;
   in response to an occurrence of an event associated with a selected resource, determining, by the computational device, a priority of the selected resource; and
   performing the action, based on at least the determined priority of the selected resource and the selected indication for the action stored in the calendar, wherein different actions are performed based on factors that affect policies to generate the different actions that are performed, wherein the factors include a time factor corresponding to a time of day, and a related resources factor in which one resource's priority is increased based on another resource's priority, and wherein different policies are maintained for a test system, a production system, and to transition the test system to the production system.

2. The method of claim 1, wherein the indication for the action indicates which action is to be performed or how the action is to be performed, and wherein the action is a notification action, the method further comprising:
   indicating at least an electronic communication address of the user in the calendar, to notify the user during a selected time period; and
   indicating, an alternate user to send the notification action if the user is unavailable during the selected time period, the method further comprising:
   in response to an occurrence of an event during the selected time period and unavailability of the user during the selected time period, sending the notification action to the alternate user, wherein the method further comprises:

maintaining customer contract information details in the calendar; and in response to exceeding contracted customer services for a customer, sending a notification to the customer for additional payments in response to an occurrence of an event associated with a resource owned or leased by the customer.

3. The method of claim 1, wherein the selected resource is a first resource, wherein the first resource is of a higher priority than a second resource, wherein the event is a failure event, the method further comprising:

in response to the failure event associated with the first resource, continuing to maintain the first resource and sending a telephonic message to an administrator indicating the failure event associated with the first resource; and in response to another failure event associated with the second resource, suspending operation of the second resource and sending an electronic mail to report the suspending of the operation of the second resource.

4. The method of claim 1, wherein:

the plurality of resources include a server, a client, a storage device, an operating system, and a network;

the priorities are maintained in a resource priority data structure maintained in the computational device;

a selected plurality of resources are grouped into a resource group, wherein all resources of the resource group have the same priority; and actions to be performed are determined based on a plurality of predetermined policies stored in the computational device, wherein different actions are performed in response to a selected event associated with the selected resource based on a relationship of the selected resource to other resources.

5. A system, comprising:

a memory; and a processor coupled to the memory, wherein the processor performs operations, the operations comprising:

maintaining, by a management application, priorities corresponding to a plurality of resources;

storing, to a calendar, indications for actions to be performed corresponding to occurrences of events, wherein the calendar is configurable by a user;

storing, to the calendar, a selected indication for an action to be performed;

in response to an occurrence of an event associated with a selected resource, determining a priority of the selected resource; and performing the action, based on at least the determined priority of the selected resource and the selected indication for the action stored in the calendar, wherein different actions are performed based on factors that affect policies to generate the different actions that are performed, wherein the factors include a time factor corresponding to a time of day, and a related resources factor in which one resource's priority is increased based on another resource's priority, and wherein different policies are maintained for a test system, a production system, and to transition the test system to the production system.

6. The system of claim 5, wherein the indication for the action indicates which action is to be performed or how the action is to be performed, and wherein the action is a notification action, the operations further comprising:

indicating at least an electronic communication address of the user in the calendar, to notify the user during a selected time period; and indicating, an alternate user to send the notification action if the user is unavailable during the selected time period, the operations further comprising:

in response to an occurrence of an event during the selected time period and unavailability of the user during the selected time period, sending the notification action to the alternate user, wherein the operations further comprise:

maintaining customer contract information details in the calendar; and in response to exceeding contracted customer services for a customer, sending a notification to the customer for additional payments in response to an occurrence of an event associated with a resource owned or leased by the customer.

7. The system of claim 5, wherein the selected resource is a first resource, wherein the first resource is of a higher priority than a second resource, wherein the event is a failure event, the operations further comprising:

in response to the failure event associated with the first resource, continuing to maintain the first resource and sending a telephonic message to an administrator indicating the failure event associated with the first resource; and in response to another failure event associated with the second resource, suspending operation of the second resource and sending an electronic mail to report the suspending of the operation of the second resource.

8. The system of claim 5, wherein:

the plurality of resources include a server, a client, a storage device, an operating system, and a network;

the priorities are maintained in a resource priority data structure;

a selected plurality of resources are grouped into a resource group, wherein all resources of the resource group have the same priority; and actions to be performed are determined based on a plurality of predetermined policies, wherein different actions are performed in response to a selected event associated with the selected resource based on a relationship of the selected resource to other resources.

9. A computer program product, the computer program product comprising:

a computer readable storage medium having computer readable program code embodied therewith, the computer readable program code configured to perform operations, the operations comprising:

maintaining, by a management application implemented in a computational device, priorities corresponding to a plurality of resources coupled to the computational device; storing, to a calendar, indications for actions to be performed corresponding to occurrences of events, wherein the calendar is configurable by a user;

storing, to the calendar, a selected indication for an action to be performed;

in response to an occurrence of an event associated with a selected resource, determining a priority of the selected resource; and performing the action, based on at least the determined priority of the selected resource and the selected indication for the action stored in the calendar, wherein different actions are performed based on factors that affect policies to generate the different actions that are performed, wherein the factors include a time factor corresponding to a time of day, and a related resources factor in which one resource's priority is increased based on another resource's priority, and wherein different policies are maintained for a test system, a production system, and to transition the test system to the production system.

10. The computer program product of claim 9, wherein:
a first policy is used to notify an administrator at any time in response to an event in the production system; and
a second policy is used to notify an administrator at selected times in response to an event in the test system.

11. The computer program product of claim 9, wherein the indication for the action indicates which action is to be performed or how the action is to be performed, and wherein the action is a notification action, the operations further comprising:
indicating at least an electronic communication address of the user in the calendar, to notify the user during a selected time period; and
indicating, an alternate user to send the notification action if the user is unavailable during the selected time period, the operations further comprising:
in response to an occurrence of an event during the selected time period and unavailability of the user during the selected time period, sending the notification action to the alternate user, wherein the operations further comprise:
maintaining customer contract information details in the calendar; and
in response to exceeding contracted customer services for a customer, sending a notification to the customer for additional payments in response to an occurrence of an event associated with a resource owned or leased by the customer.

12. The computer program product of claim 9, wherein the selected resource is a first resource, wherein the first resource is of a higher priority than a second resource, wherein the event is a failure event, the operations further comprising:
in response to the failure event associated with the first resource, continuing to maintain the first resource and sending a telephonic message to an administrator indicating the failure event associated with the first resource; and
in response to another failure event associated with the second resource, suspending operation of the second resource and sending an electronic mail to report the suspending of the operation of the second resource.

13. The computer program product of claim 9, wherein:
the plurality of resources include a server, a client, a storage device, an operating system, and a network;
the priorities are maintained in a resource priority data structure maintained in the computational device;
a selected plurality of resources are grouped into a resource group, wherein all resource of the resource group have the same priority; and
actions to be performed are determined based on a plurality of predetermined policies stored in the computational device, wherein different actions are performed in response to a selected event associated with the selected resource based on a relationship of the selected resource to other resources.

14. The method of claim 1, wherein:
a first policy is used to notify an administrator at any time in response to an event in the production system; and
a second policy is used to notify an administrator at selected times in response to an event in the test system.

15. The method of claim 14, the method further comprising:
maintaining additional policies for approval of costs that are to be charged to a customer.

16. The system of claim 5, wherein:
a first policy is used to notify an administrator at any time in response to an event in the production system; and
a second policy is used to notify an administrator at selected times in response to an event in the test system.

17. The system of claim 16, the operations further comprising:
maintaining additional policies for approval of costs that are to be charged to a customer.

18. The computer program product of claim of claim 10, the operations further comprising:
maintaining additional policies for approval of costs that are to be charged to a customer.

* * * * *

UNITED STATES PATENT AND TRADEMARK OFFICE
CERTIFICATE OF CORRECTION

| | | |
|---|---|---|
| PATENT NO. | : 8,494,931 B2 | Page 1 of 1 |
| APPLICATION NO. | : 12/832865 | |
| DATED | : July 23, 2013 | |
| INVENTOR(S) | : Jeffrey A Calcaterra et al. | |

It is certified that error appears in the above-identified patent and that said Letters Patent is hereby corrected as shown below:

Title page 1, in Item (75) under Inventors, the inventor name "Jeffrey Alan Calacaterra" is misspelt.
The correct inventor name is "Jeffrey Alan Calcaterra".

Signed and Sealed this
Seventeenth Day of March, 2015

Michelle K. Lee
*Director of the United States Patent and Trademark Office*